United States Patent [19]

Tsuchiya et al.

[11] Patent Number: 5,136,473
[45] Date of Patent: Aug. 4, 1992

[54] ELECTRIC DOUBLE LAYER CAPACITOR

[75] Inventors: Yoshinobu Tsuchiya, Fujisawa; Ken Kurabayashi, Chigasaki; Hiroyoshi Moroboshi, Yokohama, all of Japan

[73] Assignee: Isuzu Motors Limited, Tokyo, Japan

[21] Appl. No.: 635,076

[22] Filed: Dec. 28, 1990

[30] Foreign Application Priority Data

Dec. 28, 1989 [JP] Japan .................................. 1-341004

[51] Int. Cl.$^5$ .............................................. H01G 9/00
[52] U.S. Cl. ..................................... 361/502; 29/25.03
[58] Field of Search ...................... 29/25.03; 361/502

[56] References Cited

U.S. PATENT DOCUMENTS

| | | | |
|---|---|---|---|
| 3,536,963 | 10/1970 | Boos | 361/502 |
| 4,542,444 | 9/1985 | Boland | 361/502 |
| 4,626,964 | 12/1986 | Azuma et al. | 361/502 |
| 4,862,328 | 8/1989 | Morimoto et al. | 361/502 |

Primary Examiner—Donald A. Griffin
Attorney, Agent, or Firm—Staas & Halsey

[57] ABSTRACT

At least two powders of minute active carbon particles having different diameters are mixed, and the mixture is placed in a mold. While a pressure is being applied to the mixture in the mold, pulse voltages are applied between the minute active carbon particles for producing electric discharges therebetween, and the minute active carbon particles are kept at a predetermined temperature, thereby sintering the minute active carbon particles into a porous sintered body, which is used as an electrode. Two such electrodes are impregnated with an electrolyte, producing polarized electrodes. An electric double layer capacitor comprises the polarized electrodes which are sandwiched between current collectors, and separated by a separator.

4 Claims, 3 Drawing Sheets

ELECTRIC DOUBLE LAYER CAPACITOR

BACKGROUND OF THE INVENTION

The present invention relates to an electric double layer capacitor of high electrostatic capacitance which utilizes the principles of an electric double layer that is composed of an interface between activated carbon and electrolyte.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,936, for example. FIG. 5 of the accompanying drawings shows the structure of the disclosed electric double layer capacitor. The electric double layer capacitor comprises a single basic cell composed of a pair of current collectors 101 of an electron conductor which serves as a pair of collector electrodes, a pair of carbon electrodes 102 made of activated carbon particles, a pair of nonconductive gaskets 103, and an isolating plate 104 positioned between the carbon electrodes 102 for preventing electrons from moving between the electrodes 102. The carbon electrodes 102 are made as paste electrodes from a concentrated slurry which is a mixture of powdery or particulate activated carbon and an electrolyte. The electrolyte has three functions to perform. It serves as a promotor of ion conductivity, an ion source, and a binder for the carbon particles.

It is important that the internal resistance of an electric double layer capacitor be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell should be kept under vertical pressure to bring the particles of the paste activated carbon into good electric contact with each other. Conventional electric double layer capacitors require each cell to be kept under a pressure of about 100 kg/cm$^2$ though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basic cell. Therefore, the pressure to be applied to the basic cell has to be increased. Increasing the pressure, however, causes some practical problems such as the selection of means for applying the pressure and the need for high rigidity for the outer cell which houses the basic cell.

In order to solve the above problems, the applicant has proposed an electric double layer capacitor of simple structure which has a high density of stored energy and requires no means for pressurizing the electrodes, as disclosed in Japanese Patent Application No. 1(1989)-215277 (corresponding to U.S. patent application Ser. No. 550,170 and European Patent Application No. 980308781.5). The proposed electric double layer capacitor has polarized electrodes each in the form of a porous sintered body composed of minute active carbon particles which are joined together by sintering.

The density, volume resistance (specific resistance), and specific surface area of the polarized electrodes, however, vary depending on the diameter of the minute active carbon particles, and greatly affect the energy density and internal resistance of the electric double layer capacitor. For example, when minute active carbon particles are sintered under the same conditions, the volume resistance (specific resistance) of the resultant polarized electrodes is greater as the diameter of the minute active carbon particles is larger, and smaller as the diameter of the minute active carbon particles is smaller. Therefore, if minute active carbon particles of smaller diameter are employed, the resultant electric double layer capacitor has a smaller internal resistance. It has been found however that the minute active carbon particles of smaller diameter are fused together, resulting in a reduced specific surface area and a lower energy density.

SUMMARY OF THE INVENTION

It is an object of the present invention to provide an electric double layer capacitor which utilizes the principles of an electric double layer that is composed of an interface between activated carbon and electrolyte, the electric double layer capacitor having a small internal resistance without affecting the energy density.

According to the present invention, there is provided an electric double layer capacitor having an electric double layer composed of an interface between activated carbon and electrolyte, comprising at least two polarized electrodes each comprising a porous sintered body which is composed of sintered and joined minute particles of active carbon having different diameters, a separator interposed between the polarized electrodes, and a casing in which the polarized electrodes, the separator, and an electrolyte are sealingly accommodated.

According to the present invention, there is also provided a method of manufacturing a polarized electrode for an electric double layer capacitor having an electric double layer composed of an interface between activated carbon and electrolyte, the method comprising the steps of mixing at least two powders of minute active carbon particles having different diameters, placing the mixture in a mold, applying a pressure to the mixture in the mold, while the pressure is being applied to the mixture, applying pulse voltages between the minute active carbon particles for producing electric discharges therebetween, and keeping the minute active carbon particles at a predetermined temperature, thereby sintering the minute active carbon particles.

The above and other objects, features and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

Figure 1:
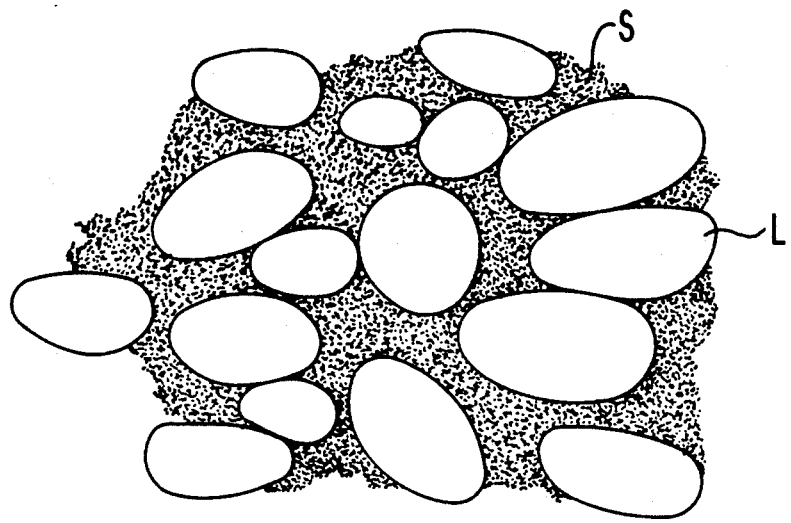
FIG. 1 is a view showing the structure of minute active carbon particles of polarized electrodes of an electric double layer capacitor according to the present invention.
Figure 2:
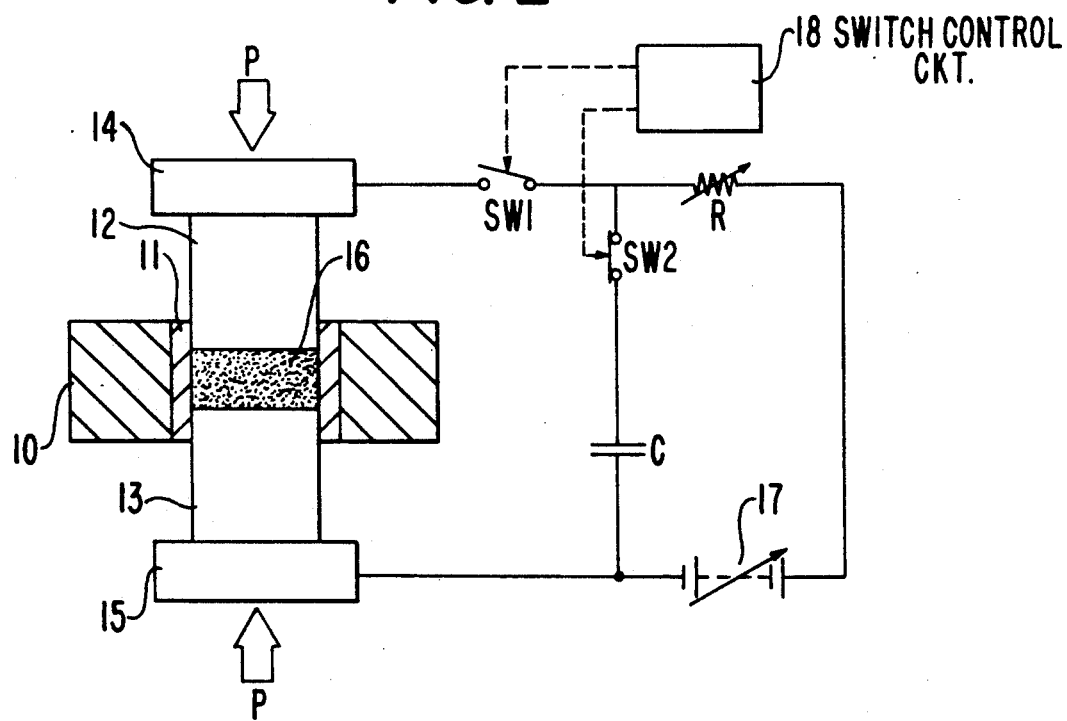
FIG. 2 is a circuit diagram showing an apparatus for manufacturing a porous sintered body according to the present invention.

FIG. 1 shows the structure of minute active carbon particles of polarized electrodes of an electric double layer capacitor according to the present invention. FIG. 2 shows an apparatus for manufacturing a porous sintered body according to the present invention.

As shown in FIG. 2, powder of minute active carbon particles is placed in a sintering mold 10. The sintering mold 10 is made of a highly strong metal such as tungsten steel, and has a central hole for placing active carbon particles therein. The inner wall of the hole is coated with an insulating material such as silicon oxide ($SiO_2$) or silicon nitride ($Si_3N_4$) by a known process such as vapor growth, thus forming an insulating layer 11. Upper and lower plungers 12, 13 have lower and upper ends, respectively, inserted in the hole in the sintering mold 10. The upper and lower plungers 12, 13 are made of a heat-resistant metal such as tungsten, molybdenum, or the like. Minute particles 16 of active carbon are sealed between the upper and lower plungers 12, 13. The upper and lower plungers 12, 13 are connected respectively to upper and lower electrodes 14, 15.

Although not shown in FIG. 2, the upper and lower plungers 12, 13 and the upper and lower electrodes 14, 15 are controllably pressed by a hydraulic press in the directions indicated by the arrows so that a desired pressure can be applied to the minute particles 16. The minute particles 16 and the sintering mold 10 are placed in a desired atmosphere. The upper and lower electrodes 14, 15 are electrically connected to a series-connected circuit of switches SW1, SW2 and a capacitor C, and a series-connected circuit of a variable resistor R and a variable-voltage power supply 17 is connected parallel to a series-connected circuit of the capacitor C and the switch SW2. The on- and off-times of the switches SW1, SW2 are controlled by a switch control circuit 18. The switch SW1 comprises a normally open switch, and the switch SW2 comprises a normally closed switch.

The sintering mold 10 may be made of a ceramic material such as silicon oxide ($SiO_2$), silicon nitride ($Si_3N_4$), silicon carbide (SiC), or the like.

Operation of the apparatus shown in FIG. 2 will be described below.

While no voltage is being applied between the upper and lower electrodes 14, 15, the upper and lower plungers 12, 13 are driven toward each other to progressively increase the pressure applied to the minute particles 16 placed therebetween.

In the condition shown in FIG. 2, the capacitor C is sufficiently charged. When the pressure applied to the minute particles 16 has reached a predetermined level, the switch SW1 is controlled so as to be repeatedly turned on and off.

The on-time of the switch SW1 is controlled so that it is equal to or shorter than a discharge time in which the charges in the capacitor C are discharged between the upper and lower electrodes 14, 15. The off-time of the switch SW1 is controlled so that it is substantially equal to or longer than a charge time in which the capacitor C can be charged. Therefore, a current flowing between the upper and lower electrodes 14, 15 is rendered variable from a maximum value to a minimum value.

Figure 3:
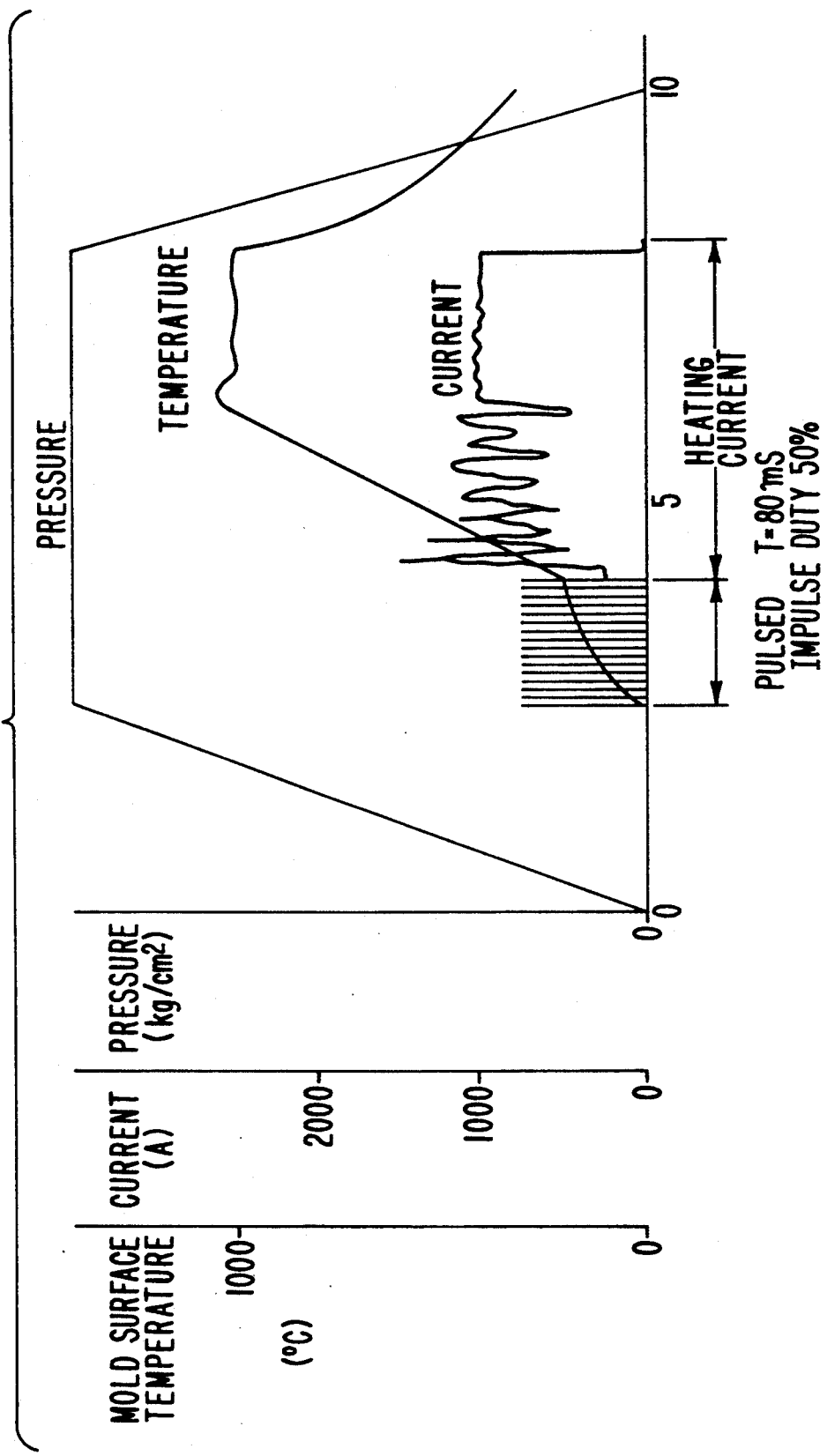
FIG. 3 is a graph showing the pressure applied to minute active carbon particles, the average current flowing through the minute active carbon particles, and the temperature of the minute active carbon particles, as they change with time.

When the switch SW1 is thus repeatedly turned on and off, sharp pulsed impulse currents flow between the upper and lower plungers 12, 13, as shown in FIG. 3.

The pulsed impulse current is supplied between the upper and lower plungers 12, 13 until almost all the minute particles of active carbon sandwiched between the upper and lower plungers are brought into contact and fused to each other. Thereafter, while the pressure applied to the minute particles 16 is being kept at a constant level, the switch SW2 is continuously turned off and the switch SW1 is continuously turned on, and the resistance of the variable resistor R and the voltage of the variable-voltage power supply 17 are regulated to continuously pass a heating current of a given value between the upper and lower electrodes 14, 15, as shown in FIG. 3.

Since those portions of the minute particles which are not sufficiently held in contact and fused to each other or are unstably fused to each other tend to collapse or the bonded regions of the fine particles tend to be displaced resulting in a local high temperature, in an initial phase of energization with the heating current, the heating current is controlled so that the temperature of the minute particles will rise slowly.

After a target temperature is reached, the heating current which is supplied is kept at a constant level for thereby maintaining the porous sintered body of active carbon whose temperature has been increased thus far at a constant temperature (see FIG. 3).

Under such a condition, the minute particles of active carbon which the porous sintered body is made of are stably bonded to each other. Now, the discharged voltage applied between the upper and lower electrodes 14, 15 is turned off, and the pressure applied therebetween is also cut off. When the temperature of the porous sintered body has dropped to normal temperature, the porous sintered body is removed from the sintering mold 10.

When powder of minute active carbon particles whose diameter is 20 μm and powder of minute active carbon particles whose diameter is 5 μm are sintered according to the above sintering process, the sintered body formed of the minute active carbon particles whose diameter is smaller is higher in density, as indicated by the following table:

| Average diameter | Density | Volume resistance | Specific surface area |
| --- | --- | --- | --- |
| 20 μm | 0.61 g/cm$^3$ | 1.4 Ωcm | 1,500 m$^2$/g |
| 5 μm | 0.82 g/cm$^3$ | 0.3 Ωcm | 700 m$^2$/g |

The particles of greater diameter have less regions where they are fused together, and the particles of smaller diameter fused together in most portions thereof. Since the particles are sintered in a short period of time due to the heat produced by the passing current according to the above sintering process, the particles are heated more in their entirety as the diameter thereof is smaller. Therefore, if the particle diameter is smaller, the specific surface area of the sintered body is lowered, and the volume resistance thereof is reduced. The sintered bodies in the above table are sintered with a pulse current of 750 A applied for 90 seconds at a temperature of 800° C. under a pressure of 300 Kg/cm² which is applied for 2 minutes.

When minute active carbon particles having different diameters are mixed and sintered, the particles L of larger diameter remain as they are and the particles S of smaller diameter are fused, as shown in FIG. 1.

Figure 4:
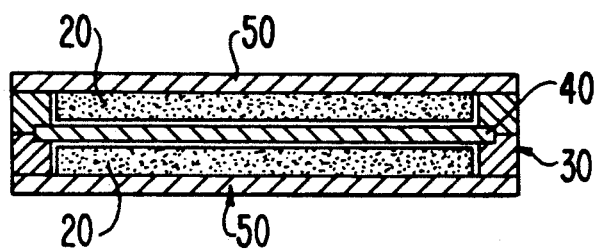
FIG. 4 is a cross-sectional view of an electric double layer capacitor according to the present invention.
Figure 5:
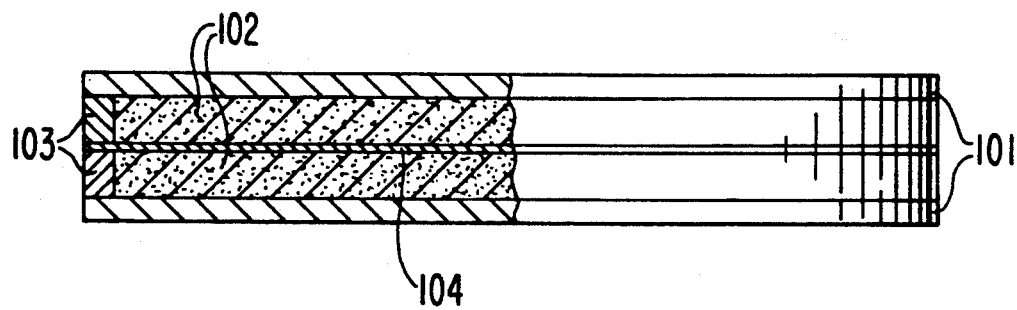
FIG. 5 is a cross-sectional view of a conventional electric double layer capacitor which has paste electrodes of a slurry.

FIG. 4 shows in cross section an electric double layer capacitor according to the present invention. The electric double layer capacitor shown in FIG. 4 includes a pair of polarized electrodes 20 each fabricated by mixing minute active carbon particles whose average diameter is 20 μm and minute active carbon particles whose average diameter is 5 μm at a ratio of 10:1, and sintering the mixture in the sintering mold shown in FIG. 2 into a porous sintered body according to the above sintering process. The polarized electrodes 20 are impregnated with dilute sulfuric acid. The electric double layer capacitor also has a gasket 30 of electrically nonconductive rubber which accommodates the polarized electrodes 20, and a separator 40 disposed between the polarized electrodes 20 for preventing electrons from moving between the polarized electrodes 20. Current collectors 50 of electrically conductive rubber are bonded to the upper and lower surfaces of the gasket 30 by an adhesive, and are joined to the polarized electrodes 20 by vulcanization.

The minute active carbon particles having different diameters are mixed as follows: The minute active carbon particles whose average diameter is 20 μm and minute active carbon particles whose average diameter is 5 μm are mixed at a ratio of 10:1, and distilled water is added to the mixture, which is then stirred into a paste. The paste mixture can be handled and measured more easily when it is filled in the sintering mold, than fine powder.

The paste mixture, thus obtained, is then sintered into a polarized electrode. Each sintered polarized electrode has a density of 0.64 g/cm³, a volume resistance (specific resistance) of 0.6 cm, and a specific surface area of 1,300 m²/g.

The sintered polarized electrode has a slightly smaller specific surface area, but a much smaller volume resistance (specific resistance), than a sintered body which is sintered of minute active carbon particles having an average diameter of 20 μm under the same conditions. Therefore, the electric double layer capacitor with such sintered polarized electrodes is small in internal resistance without greatly affecting the energy density thereof.

Although a certain preferred embodiment has been shown and described, it should be understood that many changes and modifications may be made therein without departing from the scope of the appended claims.

We claim:

1. An electric double layer capacitor having an electric double layer composed of an interface between activated carbon and electrolyte, comprising:
    at least two polarized electrodes, each comprising a porous sintered body which is composed of two powders of joined minute active carbon particles, the particles of each powder having different diameters;
    a separator interposed between said polarized electrodes; and
    a casing in which said polarized electrodes, said separator, and an electrolyte are sealingly accommodated.

2. An electric double layer capacitor according to claim 1, wherein the powder of minute active carbon particles with a smaller diameter is mixed at a ratio of about 10% with the powder minute active carbon particles having a layer diameter.

3. A method of manufacturing a polarized electrode for an electric double layer capacitor having an electric double layer composed of an interface between activated carbon and electrolyte, said method comprising the steps of:
    mixing at least two powders of minute active carbon particles having different diameters;
    placing the mixture in a mold;
    applying a pressure to the mixture in the mold;
    while said pressure is being applied to the mixture, applying pulse voltages between the minute active carbon particles for producing electric discharges therebetween; and
    keeping the minute active carbon particles at a predetermined temperature, thereby sintering the minute active carbon particles.

4. A method according to claim 3, wherein said step of mixing at least two powders of minute active carbon particles comprises the steps of adding distilled water to said at least two powders of minute active carbon particles and stirring the mixture into a paste.

* * * * *